Nov. 24, 1953  R. G. TAYLOR  2,660,229
TIRE BEAD LOOSENING LEVER
Filed Aug. 24, 1951

Inventor
R. G. Taylor
By Fetherstonhaugh & Co.
Attorneys

Patented Nov. 24, 1953

2,660,229

UNITED STATES PATENT OFFICE 2,660,229

TIRE BEAD LOOSENING LEVER

Ralph Garvie Taylor, Milford Station,
Nova Scotia, Canada

Application August 24, 1951, Serial No. 243,523

1 Claim. (Cl. 157—1.17)

This invention relates to tire removing tools and the object is to provide an efficient hand tool designed to facilitate the rapid removal of relatively large and heavy tires, such as truck tires, from the wheel rims on which they are mounted.

More particularly, the invention provides a tire removing tool comprising a pair of jaw-carrying levers having intermediate portions positioned between and secured to opposite ends of a pair of elongated connecting links by pivots affording relatively movable fulcrums about which the levers are swingable. One of the levers is provided with a rim-engaging jaw adapted to be engaged with the inner periphery of the wheel rim on which the tire is mounted. The other lever is provided with a tire-engaging jaw adapted to be forcibly inserted between one edge of the tire and the adjacent flange of the wheel rim. The last mentioned jaw is equipped with an anvil adapted to be struck by a mallet to force said jaw and the underlying edge of the tire away from the adjacent flange of the rim to thereby facilitate the stripping of the tire from the rim.

Other objects, characteristic features and advantages of the invention will be more readily understood from the following detailed description taken in connection with the accompanying drawings, in which—

Figure 1:
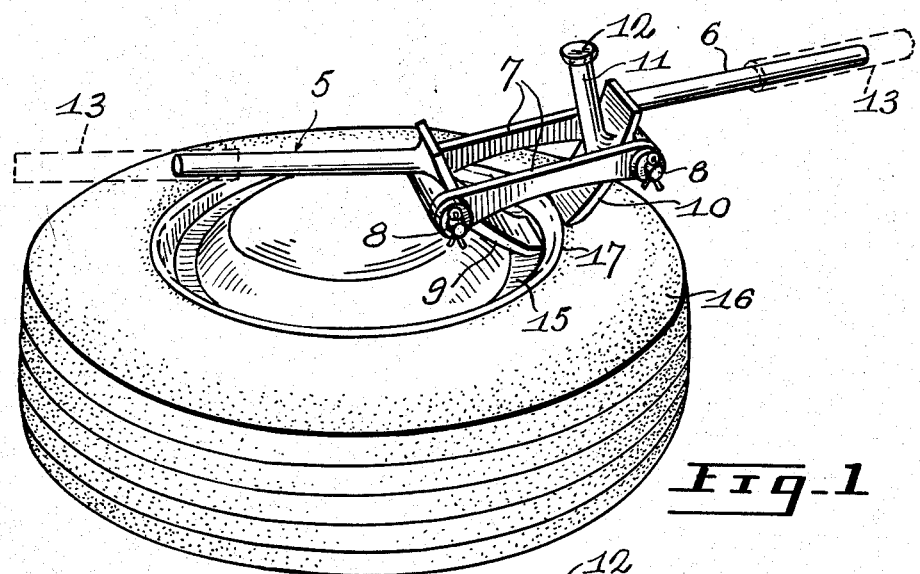
Fig. 1 is a perspective view showing the manner in which the jaws of the tool are initially engaged with the wheel rim and the tire to be removed. In this view the tire-engaging jaw is shown engaging the tire adjacent the free edge of the wheel rim flange.

As shown in these drawings, my improved tire removing tool comprises a pair of jaw-carrying levers 5 and 6 having intermediate portions interposed between and pivotally connected to opposite ends of a pair of elongated connecting links 7 by pivots 8 affording relatively movable fulcrums for the levers. Corresponding ends of the levers are provided with opposing jaw members indicated at 9 and 10. The jaw 10 carries a vertically extending projection 11 surmounted by an anvil 12. As indicated by dotted lines 13, suitable tubular extension handles of any desired length are sleeved onto the ends of the levers 5 and 6 remote from the jaws 9 and 10. These handle extensions increase the effective length of the levers and thus facilitate the operation of the tool.

Figure 2:
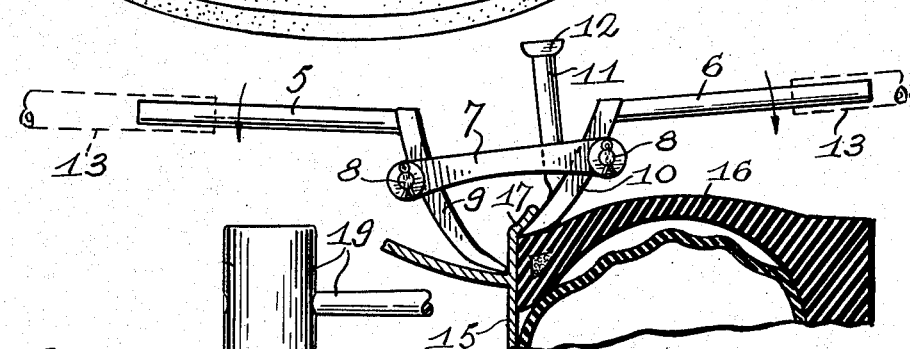
Fig. 2 is a side elevational view showing the manner in which the tire-engaging jaw is initially forced between a flange of the wheel rim and the adjacent edge of the tire.
Figure 3:
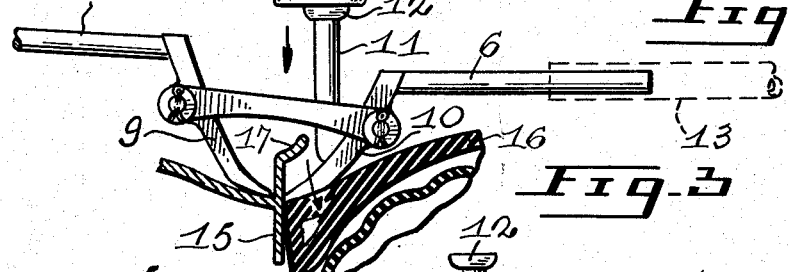
Fig. 3 is a view showing the manner in which the anvil carried by the tire-engaging jaw is brought to a vertical position by further manipulation of the levers and is then struck with a mallet to move said jaw and the underlying edge of the tire inwardly from the wheel rim flange to thereby facilitate the stripping of the tire from the rim.
Figure 4:
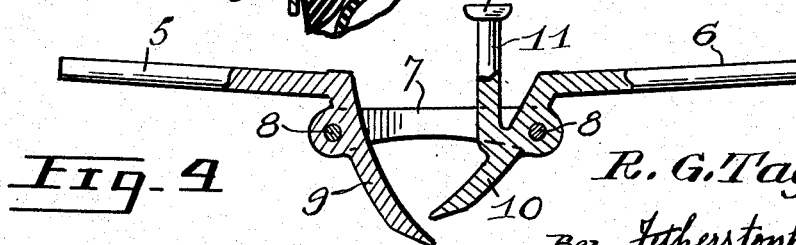
Fig. 4 is a view showing the tool partly in side elevation and partly in vertical section.

In using the tool described herein the jaw 9 is engaged against the inner periphery of the wheel rim 15 and the jaw 10 is engaged with the tire 16 at the outer edge of the rim flange 17. The levers 5 and 6 are then manipulated to force the jaw 10 between the rim flange 17 as shown in Fig. 2. By further manipulation of the levers 5 and 6 the anvil-carrying projection 11 is brought to the vertical position shown in Fig. 3 and the anvil 12 is struck by a heavy mallet 19 to force the jaw 10 and the underlying edge of the tire 16 away from the rim flange 17 to thereby facilitate the stripping of the tire from the rim.

It is important that the levers 5 and 6, the links 7, the pivots 8, the jaw members 9 and 10, and the anvil elements 11 and 12 be of strong and sturdy construction in order to stand up under the impacts delivered by the mallet 19 and to withstand the heavy stress imposed on these parts in forcing the edge of the tire away from the wheel rim. The levers 5 and 6 are preferably about 12 inches in length as measured from their point of attachment to the jaw members 9 and 10 but this is not absolutely essential since these levers, as well as the extension handles 13, may be of any suitable length.

The tool described herein is most conveniently operated by two men each working one of the jaw-carrying levers. As a general rule an operator manipulating lever 6 uses the mallet 19 for driving the jaw member 10 inwardly against the underlying edge of the tire 16.

Having thus described the nature of my invention and a preferred embodiment thereof, it will be understood that various modifications may be resorted to within the scope and spirit of the invention as defined by the appended claim.

I claim—

A hand-operated tool for removing a tire from a rim comprising a pair of levers, opposing jaw members rigidly carried by the lower ends of said levers, each of said jaw members extending at an angle to its associated lever, a pair of elongated lever-connecting link members, the jaw-carrying portions of the levers being positioned between and pivotally connected to opposite ends of said link members so that said jaw members are positioned inwardly of the pivotal connections between the levers and link members and below and between said link members with the inner faces of the jaw members opposed to each other, said levers lying in a substantially horizontal plane when in operative position and said jaw members extending downwardly with their end portions directed inwardly to engage said tire and rim respectively, and an anvil member rigidly secured to the inner face of one of said jaw members which engages said tire and extending upwardly between said links to a point above the links.

RALPH GARVIE TAYLOR.

References Cited in the file of this patent

UNITED STATES PATENTS

| Number | Name | Date |
| --- | --- | --- |
| 1,051,490 | Dobbins | Jan. 28, 1913 |
| 1,495,884 | Chapman | May 27, 1924 |
| 2,293,467 | Kenworthy | Aug. 18, 1942 |
| 2,489,088 | Hewitt | Nov. 22, 1949 |
| 2,563,987 | Colley | Aug. 14, 1951 |